United States Patent [19]

Langdon et al.

[11] 4,077,894
[45] Mar. 7, 1978

[54] GLYCOL ANTIFREEZE MIXTURES

[75] Inventors: William Keith Langdon, Grosse Ile; Daniel Ronan Dutton, Woodhaven, both of Mich.

[73] Assignee: BASF Wyandotte Corporation, Wyandotte, Mich.

[21] Appl. No.: 754,562

[22] Filed: Dec. 27, 1976

[51] Int. Cl.² ........................ B01D 19/04; C09K 5/00
[52] U.S. Cl. ........................... 252/76; 252/73; 252/77; 252/79; 252/321; 252/358; 536/4; 536/120
[58] Field of Search ................. 252/321, 358, 73, 76, 252/77, 79 R; 536/4, 120

[56] References Cited

U.S. PATENT DOCUMENTS

| 3,023,170 | 2/1962 | Linn | 252/321 |
|---|---|---|---|
| 3,215,636 | 11/1965 | Hagge et al. | 252/321 |
| 3,655,645 | 4/1972 | Jacques | 252/321 X |
| 3,931,029 | 1/1976 | Dutton et al. | 252/79 R X |
| 4,011,389 | 3/1977 | Langdon | 536/4 |

*Primary Examiner*—Harris A. Pitlick

*Attorney, Agent, or Firm*—Robert J. Henry; Bernhard R. Swick; Robert E. Dunn

[57] ABSTRACT

A glycol-based antifreeze formulation containing as a defoaming agent, from 0.001% to about 1.0% by weight of a mixture containing a compound of the formula

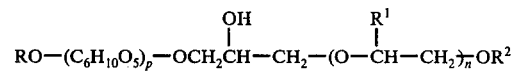

wherein R is an alkyl, alkoxyalkyl, hydroxyalkyl, or dihydroxyalkyl group having from 1 to 6 carbon atoms, $R^1$ is hydrogen, methyl or ethyl, $R^2$ is an alkyl group having 1 to 8 carbon atoms, $p$ is an integer from 1 to 20, and $n$ is an integer from 1 to 14; and a compound of the formula

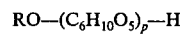

wherein R and $p$ are as defined above.

10 Claims, No Drawings

GLYCOL ANTIFREEZE MIXTURES

BACKGROUND OF THE INVENTION

1. Field Of The Invention

The present invention relates to glycol antifreeze mixtures and more particularly to glycol antifreeze mixtures containing an improved defoaming agent.

2. Description Of The Prior Art

Glycol-based antifreeze formulations containing corrosion inhibitors such as borates, silicates, phosphates, caustic, mercaptobenzothiazole, tolyltriazole, nitrates, nitrites and other inhibitors listed in the patent literature do not, by themselves, exhibit excessive foaming tendencies. However, when these glycol-based antifreezes containing the above-mentioned inhibitors are diluted with water for use in internal combustion engine cooling systems, excessive foaming occurs. This foaming causes a loss of coolant from the system and possible subsequent damage to the engine.

It is common practice to include in the glycol-based antifreeze formulations an agent or combination of agents to reduce the foaming of the water-diluted base antifreeze solution. The most commonly used defoaming agents are silicones and polymers of ethylene oxide or propylene oxide or ethylene oxide and propylene oxide copolymers commonly referred to as polyols. The latter type of defoaming agent has been used extensively, and certain modifications thereof have also been used. For example, U.S. Pat. No. 2,923,686 teaches the adduct of propylene oxide and ethylene oxide on glycerol, with each hydroxyl group of the glycerol nucleus being provided with an adduct. These compounds generally have a very low water solubility, but the solubility is sufficient to form a unitary phase in the very low concentrations used.

Certain desirable corrosion inhibitor systems are particularly likely to increase the foaming problem when placed in automobile cooling systems. For example, an excellent corrosion inhibitor is disclosed and claimed in U.S. Pat. No. 3,931,029. In this patent, a polymer of ethylene oxide and propylene oxide is suggested as a defoaming agent.

Antifreeze normally is formulated with 0.03 to 0.05% of defoaming agent. This concentration is necessary to maintain adequate defoaming action for the life of the permanent type antifreeze. A defoaming agent such as the polyol of U.S. Pat. No. 3,931,029 is normally used in the above concentration range. If added to the radiator within a relatively short period of time after it has been formulated, no problem exists, but frequently large scale users, such as the large automobile companies, store the antifreeze in large tanks that contain many thousands of gallons. Upon standing for several days to several months, the defoaming agent rises, forming an upper liquid layer. As a result, when antifreeze is drawn from the base of the tank it is deficient in defoamer and, if the tank is emptied completely, the last portion will be only defoamer, which is completely unsatisfactory as an antifreeze stock. This has been a very serious problem to antifreeze consumers as well as to antifreeze producers.

SUMMARY OF THE INVENTION

It is a primary object of this invention to provide a glycol antifreeze mixture containing a defoamer which (1) is soluble in ethylene glycol based antifreeze formulations, (2) is stable to heat, (3) provides for low foam at a low usage level, and (4) has a cost which is acceptable to the antifreeze industry.

This and other objects are achieved by utilizing in the antifreeze composition, a foam suppressing agent present in an amount of from about 0.001% to about 1.0% based on the weight of antifreeze, of a mixture consisting essentially of (1) a compound having the formula

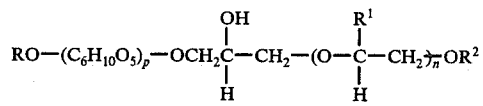

wherein R is an alkyl, alkoxyalkyl, hydroxyalkyl, or dihydroxyalkyl group having from 1 to 6 carbon atoms, $R^1$ is hydrogen, methyl, or ethyl, $R^2$ is an alkyl group having 1 to 8 carbon atoms, $p$ is an integer from 1 to 20, and $n$ is an integer from 1 to 14, and (2) a compound having the formula $$RO-(C_6H_{10}O_5)_p-H$$

wherein R is an alkyl, alkoxyalkyl, hydroxyalkyl, or dihydroxyalkyl group having from 1 to 6 carbon atoms, and $p$ is an integer from 1 to 20, and wherein the weight ratio of compound (1) and compound (2) is from about 1:10 to 10:1.

Preferably the sugar unit is mostly glucose with small amounts of lower polysaccharides, and the preferred units in the chain are made from propylene oxide units. Accordingly, a preferred foam suppressing agent consists essentially of a mixture of (1) a compound having the formula

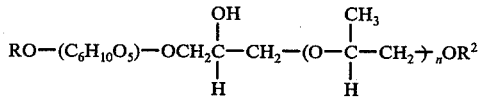

wherein R is an alkyl, alkoxyalkyl, hydroxyalkyl, or dihydroxyalkyl group having from 1 to 6 carbon atoms, $R^2$ is an alkyl group having from 1 to 8 carbon atoms, $n$ is an integer from 3 to 7, and (2) a compound having the formula $$RO-(C_6H_{10}O_5)-H$$

wherein R is as defined above and wherein the weight ratio of compound (1) and compound (2) are from about 1:3 to 3:2.

The defoaming or foam suppressing agent of the invention is particularly valuable when used with antifreeze formulations containing the corrosion inhibitor of U.S. Pat. No. 3,931,029, cited above, and insofar as the preparation and use of such inhibitors are pertinent herein, the patent disclosure is hereby incorporated by reference. In general, the inhibitors of the patent are referred to broadly as diacid inhibitors and have the following general formula:

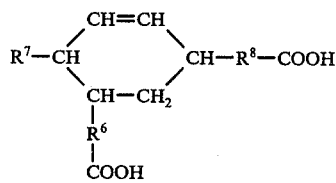

wherein $R^6$ is an alkylene radical containing from 0 to 12 carbon atoms, $R^7$ is an alkyl radical containing from 1 to 10 carbon atoms, and $R^8$ is an alkylene radical containing from 1 to 12 carbon atoms. The inhibitor also includes the mono- and di- metal salts, the mono- and di- ammonium salts, and the mono- and di- amides of the diacid diagrammed above. The preferred diacid inhibitor is 1-carboxy-2-hexyl-5-(7-carboxyheptyl)-cyclohex-3-ene.

DESCRIPTION OF THE PREFERRED EMBODIMENTS

The antifreeze composition is prepared simply by mixing the desired ingredients together in the proportions desired. As the glycol component, commercial ethylene glycol is quite satisfactory. The commercial mixture generally contains at least 85-95% by weight of ethylene glycol and the remainder diethylene glycol and small amounts of other substances which are incidentally present such as water.

The corrosion inhibitors that may be used include any of the usual inhibitor systems known in the art. Preferred is the diacid inhibitor disclosed above, and it is generally used in an amount of 0.01 to 1% by weight, with a typical amount being 0.1%. Other minor additives, some of which aid in inhibiting corrosion are also added such as sodium metaborate, potassium dibasic metaphosphate, sodium mercaptobenzothiazole sodium or potassium hydroxide, sodium nitrate, sodium nitrite, and mineral oil. The selection and combination of these materials is not critical to the present invention, and any of the typical corrosion resistant recipes may be used. However, certain of these additives tend to increase the problem of foaming, and the present invention is particularly valuable in allowing for the use of such systems by its superior foam suppressing capability.

The defoaming agent of the invention is characterized by containing a hydrophilic group in combination with a hydrophobic hydroxypolyoxyalkylene chain. The hydrophilic group is a sugar moiety, which is a monosaccharide or lower polysaccharide. Specifically, the sugar unit is converted to a glycoside such as an alkyl or hydroxyalkyl glycoside, which is then reacted with the glycidyl ether of an alkylpolyoxyalkylene, as more fully described below. With this reaction mechanism, a large number of products may be obtained, and certain of these products have been found to have excellent foam suppressing properties.

The hydrophilic compounds utilized in the invention have the structure

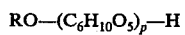

RO—$(C_6H_{10}O_5)_p$—H wherein R is an alkyl, alkoxyalkyl, hydroxyalkyl or dihydroxyalkyl group having from 1 to 6 carbon atoms, and $p$ is an integer from 1 to 20. The —$(C_6H_{10}O_5)$—group is a hexose sugar, which is preferably glucose. The sugar source utilized is preferably a commonly available material such as dextrose, sucrose, corn starch, corn syrup, cellulose, and the like. With the exception of sucrose, these sources produce glucose as the sole sugar unit, and because of its availability, glucose is preferred. However, the use of certain other available sugar units such as fructose or galactose could be used, and particularly in combination with glucose.

The material which provides a source of glucose (or other hexose) units is reacted with an alcohol or substituted alcohol containing up to about 6 carbon atoms to obtain the glucoside or glycoside used in the invention. Typical lower alcohols which may be used include methanol, ethanol, n-propanol, isopropanol, n-butanol, isobutanol, and sec-butanol. t-Butanol is not satisfactory because its hydrogen atom is of an appreciably different nature from the hydroxyl hydrogen atoms of the lower primary alcohols. When the alcohols are not substituted, the number of carbon atoms is preferably no more than 4 because of water solubility and ease of reaction with the sugar substance. Substituted lower alcohols that may be used include methoxyethanol, ethoxyethanol, methoxymethanol, ethylene glycol, propylene glycol and glycerol. Propylene glycol has been found to be particularly satisfactory.

In the matter of the source of sugar units, the preferred agents are corn starch and corn syrup, because of their ready availability and low cost, but dextrose, sucrose, lactose, and cellulose may similarly be used.

As those familiar with carbohydrate chemistry will appreciate, different reactions often occur simultaneously when an alcohol is heated together with a carbohydrate of the kind mentioned above. Water, alcohols and glycols have the property of reacting with disaccharides and higher saccharides, in a process which may be called hydrolysis, alcoholysis or glycolysis, to produce materials in which the average molecule contains fewer monosaccharide units, and in these processes no water is split out or produced; the water or alcohol or glycol is joined to a glucose unit, yielding the simple sugar or a glucoside or glycoside. At the same time, however, there is a competing reaction whereby saccharides (particularly the monosaccharides and to some extent the disaccharides and other lower saccharides) condense, with the splitting out of water, to form molecules having greater numbers of glucose units per molecule. Moreover, the reaction of a simple saccharide with an alcohol or glycol involves a splitting out of water.

Such reactions occur simultaneously to various relative extents, depending upon the reactants selected and the conditions used. By using a considerable excess of alcohol or glycol, lower reaction temperatures, shorter reaction times, and a source of glucose units which is a polysaccharide, one may minimize to a desired extent the dehydration-condensation reaction and favor the reactions whereby glucosides and lower glycosides are formed. The converse is also true. Under nearly anhydrous conditions and with a monosaccharide, high reaction temperature and a smaller proportion of alcohol or glycol, the formation of disaccharides, oligosaccharides, etc., is favored. Materials of greater average molecular weight usually have greater viscosity, a greater tendency to be solid at a given temperature, and in many cases a lower solubility. It is, accordingly, desirable to avoid producing a glycoside material having too great an average number of glucose units per molecule, such as more than 20. In the preferred examples, for the purposes of the invention, desirable results are obtained when the product is essentially a glucoside (a glycoside with one glucose unit per molecule).

The reaction of the first step is conducted in the presence of an acidic catalyst. Any suitable acid catalyst may be used, but, ordinarily, sulfuric acid is preferred because of its ready availability and low cost.

Ordinarily, the reaction of the first step may be conducted at relatively modest conditions of temperature and pressure, such as 80° to 150° Celsius and at atmospheric pressure down to 15 millimeters or less of mercury absolute pressure.

In the first step, the proportions of glucose-supplying compound and diol may be varied to suit requirements. Ordinarily, it is satisfactory to use about one to four moles of diol per mole of glucose or glucose unit. It is usually desirable not to use too great an excess of diol, since it is necessary to remove the diol from the product glucoside by vacuum stripping before proceeding to the second step of the reaction.

Those skilled in the art will appreciate that in instances in which a glucoside is available, such as α-methyl glucoside, it may be used as a starting material to supply glucose units, on the same basis as the product of the first reaction step.

The hydrophobic group utilized in the invention is attached to the sugar moiety as a hydrophobic hydroxypolyalkalene chain. This group is obtained by reacting an appropriate oxirane compound with the glycoside prepared above. The glycoside is used in excess of the stoichiometric equivalent of the oxirane compound to provide a mixture consisting essentially of (1) the reaction product of the glycoside and oxirane compound and (2) unreacted glycoside. The mixture also contains small amounts of other materials from side reactions and unreacted oxirane compound. These materials are not harmful and therefore generally not separated from the principal mixture.

The oxirane compound utilized herein is a hydrophobic glycidyl ether having the general formula

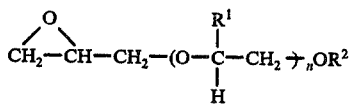

Wherein $R^1$ is hydrogen, methyl or ethyl, $R^2$ is an alkyl group having from 1 to 8 carbon atoms, and $n$ is an integer from 1 to 14. It is convenient to obtain one oxirane-containing hydrophobe material by reacting a hydrophobic alcohol with epichlorohydrin, obtaining a chlorohydrin ether which may, if desired, be reacted with caustic to effect a ring closure and obtain a derived hydrophobic glycidyl ether. In some cases, the chlorohydrin ether itself may be mixed with the glycoside and reacted with it under alkaline conditions; when this is done, the oxirane-containing hydrophobe is, in effect, formed in situ and then reacted with the glycoside.

The oxirane-containing hydrophobe is derived from a lower alkanol containing 1 to 6 carbon atoms, reacted with several moles of a lower alkylene oxide to form a hydrophobic adduct which is then reacted with epihalohydrin to form a halohydrin or glycidyl ether. In such material a hydrophobic effect is obtained if a ratio of oxygen/carbon atoms less than 0.4 prevails; in other words, although some ethylene oxide may be used, it is essential to use enough propylene oxide or butylene oxide to ensure that the resulting material is hydrophobic. However, the various units may be added either as a heteric-mixture or in sequence. In the preferred area of the invention, the alkylene oxide utilized is propylene oxide.

The reaction of the glycoside with the epoxyalkane or glycidyl ether, is catalyzed by basic catalysts. Accordingly, at the conclusion of the formation of the glycidyl ether, it is customary to add to the reaction mixture a sufficient quantity of basic material, such as potassium hydroxide or sodium hydroxide, to neutralize the acid or potentially available acid from organic chlorine that is present and provide a small quantity of basic material to catalyze the final reaction. It is usually not necessary or desirable to remove the salt that is formed by the neutralization of the acid catalyst.

In the final reaction, there is usually used about 0.1 to 0.9 mole of higher epoxyalkane or glycidyl ether per mole of the glycoside produced in the first step.

The final reaction step is generally conducted under conditions of temperature and pressure that are, on the one hand, sufficient to get a satisfactory rate of reaction and, on the other hand, not so stringent as to cause any appreciable degradation of the product. Ordinarily temperatures such as 80° to 160° Celsius and pressures ranging from the atmospheric down to 2 or 3 millimeters of mercury absolute pressure are employed. The reaction time depends principally upon the temperature employed and to some extent upon the scale of the reaction, and it may range from about 20 minutes to several hours.

The oxirane-containing hydrophobe which is reacted with the glycoside described above is believed to be capable of reacting readily with any of the hydroxyl groups present anywhere within the structure of the glycoside. As a result, it is thought that the product comprises a mixture of various individual species of compounds, which belong to a genus that may be characterized by the structural formula indicated below, namely:

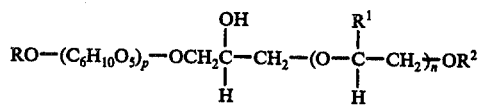

wherein R is an alkyl, alkoxyalkyl, hydroxyalkyl, or dihydroxyalkyl having from 1 to 6 carbon atoms, $R^1$ is hydrogen, methyl, or ethyl, $R^2$ is an alkyl group having 1 to 8 carbon atoms, $p$ is an integer from 1 to 20, and $n$ is an integer from 1 to 14.

In view of the excess of the glycoside reactant, the mixture will also contain a substantial amount of a compound having the formula

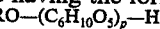

wherein R is an alkyl, alkoxyalkyl, hydroxyalkyl, or dihydroxyalkyl, and $p$ is an integer from 1 to 20. Small amounts of the oxirane reactant may also be present, which reactant has the formula

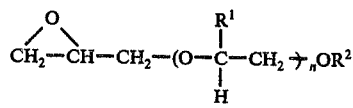

wherein $R^1$ is hydrogen, methyl or ethyl, $R^2$ is an alkyl group having from 1 to 8 carbon atoms, and $n$ is an integer from 1 to 14.

There is also a certain amount of chlorine substituted in some of the molecules as a side reaction in the preparation of the oxirane compounds. However, only a small percentage of molecules are so substituted and these materials need not be removed.

The side reaction is more clearly explained in the following discussion of the reaction for the preferred defoamer. Products which have shown the greatest promise as defoamers for antifreeze are the reaction products of crude glycidyl ethers of alkyl polyoxypropylene alcohols having 5-7 oxypropylene units with propylene glycol glycoside, in which the chief glycoside compound is glucose. The major portion of the glycoside reactant is believed to have the structure:

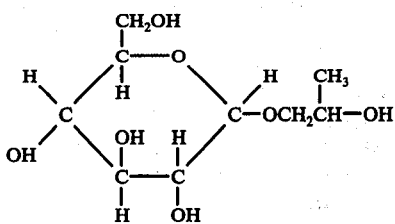

and the glycidyl ether reactant:

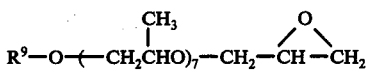

in which $R^9$ is a $C_4$ or a $C_6$ alkyl group. This latter product will contain some unreacted alkyl polyoxypropylene alcohol and some glycidyl ether having the structure:

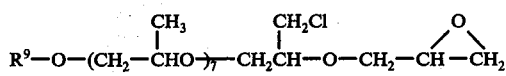

The glycoside is preferably reacted with the glycidyl ether in a 1:1 weight ratio and, since the molecular weight of the glycidyl ether is roughly twice that of the glycoside, about 50% of the glycoside molecules are unreacted. At the preferred 1:1 weight ratio of glycoside:glycidyl ether, the product is borderline in complete solubility in water at 0.1%, and is adequately soluble in the antifreeze mixtures. The glycidyl ether by itself (in the hydrated form) was found to be a poor defoamer and propylene glycol glycoside by itself had fairly strong foaming action. Therefore, the defoaming properties must result from the combination of glycoside, alkyl polyoxypropylene alcohol and adduct of glycoside to the glycidyl ether.

The invention described above is illustrated by the following specific examples, in which parts are by weight unless otherwise specified. The examples are to be interpreted as illustrative only, and not in a limiting sense.

EXAMPLE 1

Preparation Of Substituted Glycosides

Example 1a - Propylene Glycol Glycoside

To a one-liter flask, there were added 180 grams of dextrose, 84 grams of propylene glycol, and 0.2 millimeter of concentrated sulfuric acid. The contents of the flask were heated to 115° Celsius, and the mixture became clear, indicating that the dextrose had dissolved. The contents of the flask were then heated to a temperature of approximately 120° Celsius and at an absolute pressure of 150 millimeters of mercury to remove water of reaction. During this operation, the product changed from a clear, light yellow to a clear, dark viscous liquid.

Example 1b - Propylene Glycol Glycoside

To a five-liter reaction flask equipped with a stirrer, thermometer, vacuum source, nitrogen source (for blanketing), and a partial take-off distillation head were added 2751 grams of propylene glycol (36 moles) and 1656 grams of Globe corn starch (9 moles) having a moisture content of approximately 12 percent. The flask was blanketed with nitrogen and 10.8 grams of concentrated sulfuric acid were added with stirring. The mixture was heated for approximately two hours at 100 millimeters of mercury pressure while the temperature was gradually raised from 90° Celsius to 124.5° Celsius. During this period, the slurry gradually changed to a nearly clear, pale greenish liquid while 188 grams of condensed volatiles were collected. The volatiles were water contained in the corn starch and a small amount of propylene glycol. Forty-three grams of calcium carbonate powder was added, and the mixture was stirred for 1 hour and 20 minutes. The system was then evacuated to 5-7 millimeters of mercury. Unreacted propylene glycol was removed by distillation over a 4-hour period at a pot temperature of approximately 95° Celsius and a head temperature of 80° Celsius. Propylene glycol (2357 grams) was recovered. The stripped product, weighing 1904 grams, was diluted with 1656 grams of water at a temperature of 94°-100° Celsius. The solution was then treated with 89 grams of decolorizing carbon for 1 hour at 80° Celsius, followed by filtration through a sintered-glass funnel with a small amount of diatomaceous earth as filter aid. The 2937 grams of filtrate was treated in a similar manner with carbon a second time. The filtrate, amounting to 2584 grams, was concentrated by distillation at 60-75 millimeters of mercury absolute pressure to 1841 grams. The product was a pale yellow 80 percent solution of propylene glycol glycoside that was used in this form for reaction with glycidyl ethers.

Example 1c - Ethylene Glycol Monomethyl Ether Glycoside

To a one-liter flask, there were added 184 grams of unmodified corn starch containing 12 weight percent of water, 228 grams of methoxyethanol (ethylene glycol monomethylether), and 0.25 milliliter of concentrated sulfuric acid. The flask was equipped with means for maintaining a nitrogen blanket and means for condensing vapors withdrawn from the flask. The flask and its contents were then heated for three hours at atmospheric pressure under a nitrogen blanket at 115° to 128° Celsius. During this time, the reaction mixture changed from a thick slurry to a fluid light-brown translucent solution, and 69 grams of a distillate were collected.

The distillate was an azeotropic mixture of methoxyethanol with water originally present in the starch. The contents of the flask were then cooled to 55° Celsius and 10 grams of a mixture of 20 weight percent of potassium hydroxide in methanol were added. Methoxyethanol was removed from material in the flask by distillation at a temperature of approximately 50° to 60° Celsius and at an absolute pressure that was gradually reduced from 60 millimeters to 25 millimeters of mercury over a 50-minute period. In this way, 133 grams of a further distillate were collected.

Example 1d - Ethylene Glycol Glycoside

Corn starch (1840 grams, 10 anhydroglucose units) was added to ethylene glycol (2480 grams, 40 moles), 18.8 grams of concentrated sulfuric acid, and 32 grams of a 50 weight percent solution of hypophosphorous acid. The mixture was heated to 120°-123° Celsius, while the pressure was gradually reduced from atmospheric pressure to 50 millimeters of mercury over 1.5 hours. At this stage, the starch slowly had been transformed into a clear, golden liquid. Barium hydroxide octohydrate (136 grams) was added, and excess glycol was removed by vacuum distillation. To control foaming during this vacuum distillation, a few drops of silicone anti-foaming agent was added. Ethylene glycol (1917 grams) was recovered over a 4.3 hour period, with the final pot temperature being 155° Celsius and the pressure being 4 millimeters of mercury. The weight of the stripped product was 2191 grams. This product was taken up in 1977 grams of water and treated with 95 grams (5 percent by weight) of activated carbon at 80° to 95° Celsius for one hour. The solution was then filtered and concentrated by distillation to 2792 grams. Analysis revealed that the material so prepared had a solids content of 72.6 percent by weight, or 2027 grams. The theoretical yield of ethylene glycol glycoside, assuming that all of the corn starch had been converted to ethylene glycol glucoside, is about 2240; this conversion would require the consumption of 10 moles of ethylene glycol, whereas the amount of ethylene glycol recovered indicates that 9.08 moles of ethylene glycol were consumed. These data indicate that the ethylene glycol glycoside so produced has a high percentage content of ethylene glycol glucoside, probably about 80 to 90 weight percent, and a low content of higher glycoside. The product so made is relatively low in viscosity at temperatures greater than 120° Celsius.

EXAMPLE 2

Preparation Of Glycidyl Ethers

Example 2a - Glycidyl Ether Prepared From n-Butanol and 3 Propylene Oxide Units

Metallic sodium (8.5 grams) was added to n-butanol (1700 grams) to provide a solution of sodium butoxide catalyst in butanol. An aliquot of such solution (818 grams) was charged to a clean, dry, nitrogen-flushed autoclave having a capacity of about 4 liters. The autoclave was purged at room temperature with nitrogen and pressurized to 2 atmospheres absolute pressure with nitrogen and heated to 115° Celsius. Propylene oxide (1914 grams) was added over a nine-hour period at a maximum pressure of 115 lbs. per square inch gauge while the temperature was maintained at 115° Celsius. Stirring was continued for two additional hours at 115° Celsius, and the contents were discharged after being cooled to 50° Celsius. The weight of the product was 2707 grams. Catalyst was removed from the product by treatment with 81 grams of finely divided synthetic magnesium silicate for one hour at 80° Celsius, followed by filtration. The weight of the filtrate was 2563 grams. Volatiles remaining in the product were then removed by vacuum stripping at 3 millimeters of mercury absolute pressure, while the temperature was raised to 90° Celsius. The weight of the product after removal of volatiles was 2396 grams. Analysis indicated the product to have a hydroxyl number of 219, which corresponds to a molecular weight of 256. This corresponds to an oxypropylated butanol having approximately 3 oxypropyl groups.

The above-mentioned oxypropylated butanol was converted to a corresponding hydrophobic glycidyl ether. To a 2-liter flask equipped with a stirrer, thermometer, and addition funnel, there were added 1280 grams (5 moles) of the above-mentioned oxypropylated butanol and 2.6 grams of boron fluoride etherate catalyst. The contents of the flask were warmed to 50° Celsius, and 555 grams (6 moles) of epichlorohydrin was added from the addition funnel over a period of one hour at a temperature of 50° to 59° Celsius. Stirring was continued at 50° to 59° Celsius for two hours, and the product was then stored at room temperature without any further treatment. After standing for several days, the product was reacted with caustic soda to form the corresponding glycidyl ether.

This was done by placing 1200 grams of a 40 weight percent aqueous solution of sodium hydroxide in a 3-liter flask and warming the contents of the flask to 40° Celsius. Then, the epichlorohydrin adduct, described above, was added to the caustic soda solution with stirring over a period of 30 minutes. The resulting milky slurry was heated to 80° Celsius and stirred for 30 minutes. It was then cooled to 40° Celsius and diluted with 700 grams of water to dissolve the sodium chloride. The organic layer was separated and was stripped of volatiles by being subjected to temperatures up to 100° Celsius at 5 millimeters of mercury absolute pressure. Thereafter, the product was treated with 49.5 grams of synthetic magnesium silicate and filtered to remove any residual base that may have been present. The filtrate was clear, and weighed 1578 grams.

Analysis gave an oxirane oxygen content of 4.22 weight percent, a chlorine content of 3.1 weight percent, and a hydroxyl number of 27.8. The product is thus a glycidyl ether having, as a major component, a compound having a structural formula of

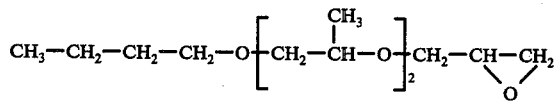

Example 2b - Glycidyl Ether Prepared From n-Butanol and 5 Propylene Oxide Units

The procedure of Example 1a was repeated except that 5 moles of propylene oxide were charged per moles of n-butanol and sodium butoxide in the reactor. Analysis of the oxypropylated butanol thus obtained indicated a molecular weight of 337 based on the hydroxyl content determined, which compares closely to the theoretical molecular weight of 364. This oxypropylated butanol was then converted to the glycidyl ether by the procedure of example 2a. Analysis of the product thus obtained showed an oxirane oxygen content of 3.41 weight percent, a chlorine content of 2.85 weight percent, and a hydroxyl number of 19.8.

Example 2c - Glycidyl Ether Prepared From n-Butanol and 6.3 Propylene Oxide Units A different hydrophobic glycidyl ether, based upon butanol plus 6.3 moles of propylene oxide, was prepared. A 482-gram aliquot of the solution of n-butanol and sodium butoxide described above in Example 2a was charged to a 4-liter autoclave and reacted with 2367 grams of propylene oxide by procedures similar to that used in Example 2a. The weight of product discharged from the autoclave was 2801 grams, and the weight after treatment with finely divided magnesium silicate and stripping was 2658 grams. Analysis indicated a hydroxyl number of 132, which corresponds to an average molecular weight of 425 and the structure of an oxypropylated butanol having approximately 6.3 oxypropyl groups (theoretical molecular weight of 438).

Then, 850 grams (2 mole equivalents) of the oxypropylated butanol prepared as indicated above was reacted with 222 grams (2.4 moles) of epichlorohydrin in the presence of 2 grams of boron fluoride etherate as catalyst, by a procedure similar to that described above in Example 2a. This yielded a product which was reacted with caustic soda and subsequently treated with synthetic magnesium silicate, as described in Example 2a. The weight of the product after filtration was 1041 grams. Analysis gave an oxirane oxygen content of 2.69 weight percent, a chlorine content of 2.5 weight percent, and a hydroxyl number of 29.3. There is thus made a hydrophobic glycidyl ether that may be considered as having as a major component a compound having the structural formula of

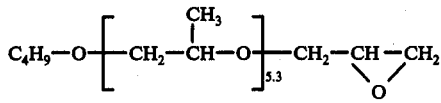

Example 2d - Glycidyl Ether Prepared From n-Butanol and 7 Propylene Oxide Units The procedure of Example 2a was repeated except that 7 moles of propylene oxide were charged per mole of n-butanol and sodium butoxide in the reactor. Analysis of the product indicated a molecular weight of 443 based on hydroxyl content, whereas the theoretical molecular weight is 480. This oxypropylated butanol was then converted to the glycidyl ether by the procedure of Example 2a. Analysis of this product indicated an oxirane oxygen content of 2.8 weight percent, a chlorine content of 4.0 weight percent, and a hydroxyl number of 16.1.

Example 2e - Glycidyl Ether Prepared From n-Butanol and 11 Propylene Oxide Units Still another hydrophobic glycidyl ether was prepared, based upon n-butanol and approximately 11 moles of propylene oxide per mole of butanol. n-Butanol (293 grams, 4 moles) containing 1 weight percent of sodium ion was reacted with propylene oxide (2509 grams) in a manner similar to that described in Example 2a. The weight of product after treatment with finely divided synthetic magnesium silicate and stripping was 2580 grams. The hydroxyl number was 83, which corresponds to an average molecular weight of 676.

The oxypropylated butanol prepared above (1352 grams, 2 moles) was reacted with 222 grams (2.4 moles) of epichlorohydrin in the presence of 2.8 grams of boron fluoride etherate as catalyst, in a manner similar to that described in Example 2a. The weight of product, after stripping and treatment with synthetic magnesium silicate, was 1514 grams. Analysis gave an oxirane oxygen content of 1.76 weight percent, a chlorine content of 1.2 weight percent, and a hydroxyl number of 25.

Example 2f - Glycidyl Ether Prepared From n-Hexanol and 3 Propylene Oxide Units Metallic sodium (6.8 grams) was added to n-hexanol (1700 grams) to provide a solution of sodium hexoxide catalyst in hexanol. An aliquot of such solution (10 moles) was charged to a clean, dry, nitrogen flushed autoclave having a capacity of about 4 liters. The autoclave was purged at room temperature with nitrogen and heated to 115° Celsius. Propylene oxide (30 moles) was added over a nine hour period at a maximum pressure of 115 lbs. per square inch gauge while the temperature was maintained at 115° Celsius. Stirring was continued for two additional hours at 115° Celsius, and the contents were discharged after being cooled to 50° Celsius. Catalyst was removed from the product by treatment with 80 grams for finely divided synthethic magnesium silicate for one hour at 80° Celsius, followed by filtration. Volatiles remaining in the product were then removed by vacuum stripping at 3 millimeters of mercury absolute pressure, while the temperature was raised to 90° Celsius. Analysis indicated the product to have a hydroxyl number corresponding to a molecular weight of 279, which is close to the theoretical molecular weight of 276 for an oxypropylated hexanol having three oxypropyl groups.

The above-mentioned oxypropylated hexanol was then converted to the corresponding glycidyl ether by the following procedure. To a 2-liter flask equipped with a stirrer, thermometer, and addition funnel, there were added 5 moles of the above-mentioned oxypropylated hexanol and 2.6 grams of boron fluoride etherate catalyst. The contents of the flask were warmed to 50° Celsius, and 6 moles of epichlorohydrin were added from the addition funnel over a period of 1 hour at a temperature of 50°-59° Celsius. Stirring was continued at 50°-59° Celsius for 2 hours, and the product was then stored at room temperature. After standing, the product was reacted with caustic soda to form the corresponding glycidyl ether.

This was accomplished by placing 1200 grams of a 40 weight percent aqueous solution of sodium hydroxide in a 3-liter flask and warming the contents of the flask to 40° Celsius. Then the epichlorohydrin adduct, prepared as described above, was added to the caustic solution with stirring over a period of 30 minutes. The resulting milky slurry was heated to 80° Celsius and stirred for 30 minutes. It was then cooled to 40° Celsius and diluted with 700 grams of water to dissolve the sodium chloride. The organic layer was separated and was stripped of volatiles by being heated to temperatures up to 100° Celsius at an absolute pressure of 5 millimeters. Thereafter, the product was treated with 49.5 grams of synthetic magnesium silicate and filtered to remove any residual base that may have been present.

Analysis of the product thus obtained showed an oxirane content of 4.02 weight percent, a chlorine content of 3.1 weight percent, and a hydroxyl number of 15. The product is therefore a glycidyl ether having, as a major component thereof, a compound having a structural formula of

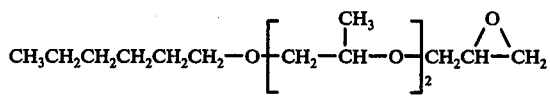

Example 2g - Glycidyl Ether Prepared From n-Hexanol and 5 Propylene Oxide Units Using the procedure of Example 2f, an aliquot of the solution of n-hexanol and sodium hexoxide of Example 2f is reacted with propylene oxide in approximately a mole ratio of 5 moles of propylene oxide per mole of hexanol and hexoxide present in the mixture. Analysis of a product so made indicated a molecular weight of 356 based on hydroxyl content, which compares closely to the theoretical molecular weight of 392.

Then, 784 grams (2 mole equivalents) of the oxypropylated hexanol was reacted with 222 grams (2.4 moles) of epichlorohydrin in the presence of 2 grams of boron fluoride etherate as catalyst, by a procedure similar to that described above in Example 2f. This yielded a product which was reacted with caustic soda and subsequently treated with synthetic magnesium silicate as described in Example 2f. Analysis of this product showed an oxirane content of 3.32 weight percent and a chlorine content of 2.7 weight percent. In this way, a glycidyl ether is prepared which has, as its major component, a compound having the structural formula of

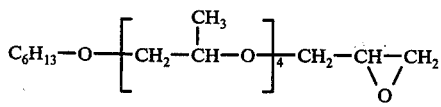

Example 2h - Glycidyl Ether Prepared From n-Hexanol and 7 Propylene Oxide Units

Using the procedure of Example 2f, an aliquot of the solution of n-hexanol and sodium hexoxide of Example 2f is reacted with propylene oxide in approximately a mole ratio of 7 moles of propylene oxide per mole of hexanol and hexoxide present in the mixture. Analysis of a product so made showed a molecular weight of 483 based on the hydroxyl content, which compares closely to the theoretical molecular weight of 508 for the adduct of n-hexanol and 7 propylene oxide units.

Then 986 grams (2 mole equivalents) of the oxypropylated hexanol was reacted with 222 grams (2.4 moles) of epichlorohydrin in the presence of 2.4 grams of boron fluoride etherate as a catalyst, in a manner similar to that described in Example 2f. Analysis of this product showed an oxirane content of 2.51 weight percent, a chlorine content of 2.3 weight percent, and a hydroxyl number of 8.4. In this way, a glycidyl ether is prepared, which has, as its major component, a compound having the structural formula of

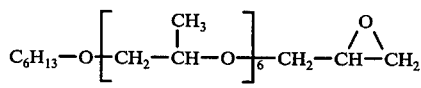

Example 2i - Glycidyl Ether Prepared From n-Butanol and A Mixture Of Ethylene Oxide and Propylene Oxide (about 7 Units)

Using the procedure of Example 2a, an aliquot of the solution of n-butanol and sodium butoxide of Example 2a is reacted with a mixture of propylene oxide and ethylene oxide, with said mixture being in the ratio of 2 parts propylene oxide to 1 part ethylene oxide by weight. The proportions of the reactants were adjusted to provide an adduct having a theoretical molecular weight of 450 or about 7.14 alkylene oxide groups per n-butanol group. Analysis of the product so obtained indicated a molecular weight of 425, based on hydroxyl group determination.

Then 850 grams (2 mole equivalents) of the oxyalkylated butanol was reacted with 222 grams (2.4 moles) of epichlorohydrin in the presence of 2.2 grams of boron fluoride etherate as a catalyst, in a manner similar to that described in Example 2a. Analysis of the product thus obtained indicated an oxirane content of 2.92 weight percent, a chlorine content of 2.93 weight percent, and a hydroxyl number of 11.2. In this way, a glycidyl ether is prepared, which has, as its major component, a compound having the structural formula of

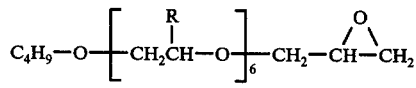

wherein R is H or $CH_3$, and about 60% of the R groups are $CH_3$.

Example 2j - Glycidyl Ether Prepared From n-Butanol and A Mixture Of Ethylene Oxide and Propylene Oxide (about 13 Units)

Using the procedure of Example 2a, an aliquot of the solution of n-butanol and sodium butoxide of Example 2a is reacted with a mixture of propylene oxide and ethylene oxide, with said mixture being in the ratio of 2 parts propylene oxide to 1 part ethylene oxide by weight. The proportions of the reactants were adjusted to provide an adduct having a theoretical molecular weight of 750 or about 12.87 alkylene oxide groups per n-butanol group. Analysis of the product obtained indicated a molecular weight of 668, based on hydroxyl group determination.

Then 1336 grams (2 mole equivalents) of the oxyalkylated butanol was reacted with 222 grams (2.4 moles) of epichlorohydrin in the presence of 2.8 grams of boron fluoride etherate as a catalyst, in a manner similar to that described in Example 2a. Analysis of the product thus obtained showed an oxirane content of 2.0 weight percent, a chlorine content of 2.06 weight percent, and a hydroxyl content of 15.8 weight percent.

Example 2k - Glycidyl Ether Prepared From Methanol and Propylene Oxide (8 Units)

In accordance with the procedure of Example 2a, metallic sodium was added to methanol to provide a solution of sodium methoxide catalyst in methanol. An aliquot of such solution was reacted with propylene oxide in a mole ratio of 8 moles of propylene oxide per mole of methanol and methoxide present in the mixture. Analysis of a product so made indicated a molecular weight of 390 based on the hydroxyl content.

Continuing the procedure of Example 2a, 2 mole equivalents of the oxypropylated methanol was reacted with 2.4 moles of epichlorohydrin using boron fluoride etherate as a catalyst. Analysis of the product indicated an oxirane content of 3.07 weight percent, a chlorine content of 2.8 weight percent, and a hydroxyl number of 22.4.

EXAMPLE 3

Preparation Of Antifreeze Defoaming Concentrates
Example 3a - Defoaming Concentrate Based On The Combination Of Propylene Glycol Glycoside and A Glycidyl Ether Made From n-Butanol and About 6.3 Propylene Oxide Units To a one-liter flask blanketed with nitrogen and equipped with a stirrer, addition funnel, thermometer, and vacuum take-off head, there were added 300 grams of propylene glycol glycoside solution, prepared as indicated in Example 1b, and 8 grams of a 50 weight percent aqueous solution of sodium hydroxide. Water was removed by distillation at 5 millimeters of mercury absolute pressure and at temperatures of up to 147° Celsius. Using such conditions, 71 grams of volatiles were taken off, over a period of 38 minutes. Then, 240 grams of the glycidyl ether prepared in Example 2c were added dropwise at 140° to 149° Celsius over a period of one hour. At the start of the reaction, the reaction mixture was highly viscous, and it became readily stirrable as the glycidyl ether was added. After completion of the addition, the reaction mixture was stirred for one hour at 140° to 146° Celsius. The weight of the product was 477 grams. Two hundred grams of the product were diluted with 50 grams of water to give a product containing 80 weight percent of solids. Upon standing such product formed two phases, which were separated at 90° Celsius. The upper layer comprised 70 weight percent of the product, had a solids content of 93 percent, and contained the reaction product of the two reactants. The lower layer, comprising 30 percent of the product, had a solids content of 82 weight percent, and consisted chiefly of unreacted propylene glycol glycoside. A Draves sink test using a 3-gram hook was conducted upon an aqueous solution containing 0.1 weight percent of the upper layer ingredient, the oxypropylated n-butyl glycidyl ether adduct to propylene glycol glycoside, and a wetting-out time of 32.5 seconds was observed. The same 0.1 weight percent solution exhibited a surface tension of 35.1 dynes per centimeter at 25° Celsius, and substantially no foaming when tested in a Dynamic Foam Test at 400 milliliters per minute at temperatures of 25° and 50° Celsius. In this example, the upper layer product was used as the defoaming concentrate.

Example 3b - Defoaming Concentrate Based On The Combination Of Propylene Glycol Glycoside and A Glycidyl Ether Made From n-Butanol and About 7 Propylene Oxide Units The procedure of Example 3a was repeated except that 240 grams of the glycidyl ether prepared in Example 2d was used. A single phase product was formed which contains a mixture of oxypropylated n-butyl glycidyl ether adduct to propylene glycol glycoside and unreacted propylene glycol glycoside. A 0.1 percent aqueous solution had a Draves sink time of greater than 1200 seconds, a surface tension of 32.8 dynes per centimeter at 25° Celsius, and no foaming when tested in a Dynamic Foam Test at 400 milliliters per minute at temperatures of 25° and 50° Celsius.

Example 3c - Defoaming Concentrate Based On The Combination Of Propylene Glycol Glycoside and A Glycidyl Ether Made From n-Butanol and About 5 Propylene Oxide Units The procedure of Example 3a was repeated except that 240 grams of the glycidyl ether prepared in Example 2b was used. A single phase product was formed which contains a mixture of oxypropylated n-butyl glycidyl ether adduct to propylene glycol glycoside and unreacted propylene glycol glycoside. A 0.1 percent aqueous solution had a Draves sink time of 75 seconds, a surface tension of 31.6 dynes per centimeter at 25° Celsius, and no foaming when tested in a Dynamic Foam Test at 400 milliliters per minute at temperatures of 25° and 50° Celsius.

Example 3d - Defoaming Concentrate Based On The Combination Of Ethylene Glycol Glycoside and A Glycidyl Ether Made From n-Butanol and About 7 Propylene Oxide Units The procedure of Example 3a was repeated except that 240 grams of the ethylene glycol glycoside of Example 1d and 240 grams of the glycidyl ether prepared in Example 2b was used. A single phase product was formed which contains a mixture of oxypropylated n-butyl glycidyl ether adduct to ethylene glycol glycoside and unreacted ethylene glycol glycoside. A 0.1 percent aqueous solution had a Draves sink time of 233 seconds, a surface tension of 32.1 dynes per centimeter at 26° Celsius, and no foaming when tested in a Dynamic Foam Test at 400 milliliters per minute at 25° and 50° Celsius.

Example 3e - Defoaming Concentrate Based On The Combination Of Propylene Glycol Glycoside and A Glycidyl Ether Made From n-Hexanol and 7 Propylene Oxide Units The procedure of Example 3a was repeated except that 240 grams of the glycidyl ether prepared in Example 2h was used. A single phase product was formed which contains a mixture of oxypropylated n-hexanol glycidyl ether adduct to propylene glycol glycoside and unreacted propylene glycol glycoside. A 0.1 percent aqueous solution had a Draves sink time of 314 seconds, a surface tension of 31.4 dynes per centimeter at 25° Celsius, and no foaming in a Dynamic Foam Test at 400 milliliters per minute at 25° and 50° Celsius.

Example 3f - Defoaming Concentrate Based On The Combination Of Propylene Glycol Glycoside and A Glycidyl Ether Made From n-Hexanol and 5 Propylene Oxide Units The procedure of Example 3a was repeated except that 240 grams of the glycidyl ether prepared in Example 2g was used. A single phase product was formed which contains a mixture of oxypropylated n-hexanol glycidyl ether adduct to propylene glycol glycoside and unreacted propylene glycol glycoside. A 0.1 percent aqueous solution had a Draves sink time of 39 seconds, a surface tension of 31.2 dynes per centimeter at 25° Celsius, and a Dynamic Foam Test of 2 millimeters with 1 second break time at 400 milliliters per minute at 25° Celsius and no foam at 50° Celsius.

Example 3g - Defoaming Concentrate Based On The Combination Of Propylene Glycol Glycoside and A Glycidyl Ether Made From n-Butanol and about 3 Propylene Oxide Units The procedure of Example 3a was repeated except that 240 grams of the glycidyl ether prepared in Example 2a was used. A single phase product was formed which contains a mixture of oxypropylated n-butanol glycidyl ether adduct to propylene glycol glycoside and unreacted propylene glycol glycoside. A 0.1 percent aqueous solution had a Draves sink time of 248 seconds, a surface tension of 28.1 dynes per centimeter, and the Dynamic Foam Test at 400 milliliters per minute at 25° Celsius showed a foam of 30 milliliters breaking in 6 seconds and at 50° Celsius a foam of 10 millimeters breaking in 1 second.

Example 3h - Defoaming Concentrate Based On The Combination Of Propylene Glycol Glycoside and A Glycidyl Ether Made From n-Butanol and About 11 Propylene Oxide Units The procedure of Example 3a was repeated except that 240 grams of the glycidyl ether prepared in Example 2e was used. A two phase product was formed and diluted with ethylene glycol to make a single phase product. The reaction product contains a mixture of oxypropylated n-butylglycidyl ether adduct to propylene glycol glycoside and a rather large amount of unreacted propylene glycol glycoside. An aqueous solution containing 0.1 percent of the reaction product (prior to addition to ethylene glycol) had a Draves sink time of 122 seconds, and a surface tension of 30.6 dynes per centimeter.

Example 3i - Defoaming Concentrate Based On The Combination Of Propylene Glycol Glycoside and A Glycidyl Ether Made From n-Butanol and About 11 Propylene Oxide Units The procedure of Example 3k was repeated except that 720 grams of the glycidyl ether prepared in Example 2e was used. Additionally, the weight ratio of glycidyl ether to propylene glycol glycoside was 1:3. A single phase product was formed which contains a mixture of oxypropylated n-butylglycidyl ether adduct to propylene glycol glycoside and unreacted propylene glycol glycoside. A 0.1 percent aqueous solution of the product had a Draves sink time of greater than 1200 seconds, a surface tension of 35.3 dynes per centimeter, and no foaming in a Dynamic Foam Test at 400 millimeters per minute at 25° and 50° Celsius.

Example 3j - Defoaming Concentrate Based On The Combination Of Propylene Glycol Glycoside and Glycidyl Ether Made From n-Hexanol and about 3 Propylene Oxide Units The procedure of Example 3a was repeated except that 240 grams of the glycidyl ether prepared in Example 2f was used. A single phase product was formed which contains a mixture of oxypropylated n-hexylglycidyl ether adduct to propylene glycol glycoside and unreacted propylene glycol glycoside. A 0.1 percent aqueous solution of the product had a Draves sink time of 25.3 seconds, a surface tension of 29.7 dyes per centimeter, and a Dynamic Foam Test at 400 millimeters per minute of 10 millimeters and a break time of 2 seconds at 25° Celsius, and at 50° Celsius a foam height of 5 millimeters and a break time of 2 seconds.

Example 3k - Defoaming Concentrate Based On The Combination Of Propylene Glycol Glycoside and A Glycidyl Ether Made From n-Butanol and About 7 Units Of A Mixture Of Ethylene Oxide and Propylene Oxide The procedure of Example 3a was repeated except that 240 grams of the glycidyl ether prepared in Example 2i was used. A single phase product was formed which contains a mixture of oxyalkylated n-butanol adduct to propylene glycol glycoside and unreacted propylene glycol glycoside. A 0.1 percent aqueous solution of the product had a Draves sink time of greater than 600 seconds, a surface tension of 38.2 dynes per centimeter, and a Dynamic Foam Test at 400 millimeters per minute of 18 millimeters and an immediate break time, at 25° Celsius, a foam of 12 millimeters and an immediate break time.

Example 3l - Defoaming Concentrate Based On The Combination Of Propylene Glycol Glycoside and A Glycidyl Ether Made From n-Butanol and About 13 Units Of A Mixture Of Ethylene Oxide and Propylene Oxide The procedure of Example 3a was repeated except that 240 grams of the glycidyl ether prepared in Example 2j was used. A single phase product was formed which contains a mixture of oxyalkylated n-butanol adduct to propylene glycol glycoside and unreacted propylene glycol glycoside. A 0.1 percent aqueous solution of the product had a Draves sink time of greater than 600 seconds, a surface tension of 37.4 dynes per centimeter, and a Dynamic Foam Test at 400 millimeters per minute of 22 millimeters at 25° Celsius and 10 millimeters at 50° Celsius with an immediate break time at both temperatures.

Example 3m - Defoaming Concentrate Based On The Combination Of Propylene Glycol Glycoside and A Glycidyl Ether Made From Methanol and About 8 Propylene Oxide Units The procedure of Example 3a was repeated except that 240 grams of the glycidyl ether prepared in Example 2k was used. A single phase product was formed which contains a mixture of oxypropylated methanol adduct to propylene glycol glycoside and unreacted propylene glycol glycoside. A 0.1 percent aqueous solution of the product had a Draves sink time of greater than 1200 seconds, a surface tension of 36.3 dynes per centimeter, and a Dynamic Foam Test at 400 milliliters per minute of 15 milliliters at 25° Celsius and 9 milliliters at 50° Celsius with an immediate break time at both temperatures.

EXAMPLE 4

Preparation Of Antifreeze Compositions According To The Invention

A typical base antifreeze solution was prepared by mixing the following ingredients in the proportions given (said proportions are by weight):

| Component | Percentage |
|---|---|
| Ethylene glycol | 90.61 |
| Diethylene glycol | 4.99 |
| $Na_2B_4O_7 \cdot 5H_2O$ | 1.32 |
| NaOH (50% solution) | 0.74 |
| Sodium Mercaptobenzothiazole (50% solution) | 0.15 |
| Sodium Nitrite | 0.05 |
| Water | 2.04 |
| 1-Carboxy-2-hexyl-5-(7-carboxyheptyl)-cyclohex-3-ene | 0.10 |

Examples 4a through 4m -Antifreeze Compositions Containing Various Defoaming Agents Compositions containing the defoaming concentrates of Examples 3a-3m were prepared by adding said concentrates to the base antifreeze compositions of Example 4 in a weight percent of 0.1 percent. Thus Example 4a contains 0.1 percent of the concentrate of Example 3a, Example 4b contains 0.1 percent of the concentrate of Example 3b, Example 4c contains 0.1 percent of the concentrate of Example 3c, Example 4d contains 0.1 percent of the concentrate of Example 3d, Example 4e contains 0.1 percent of the concentrate of Example 3e, Example 4f contains 0.1 percent of the concentrate of Example 3f, Example 4g contains 0.1 percent of the concentrate of Example 3g, Example 4h contains 0.1 percent of the concentrate of Example 3h, Example 4i contains 0.1 percent of the concentrate of Example 3i, Example 4j contains 0.1 percent of the concentrate of Example 3j, Example 4l contains 0.1 percent of the concentrate of Example 3l, and Example 4m contains 0.1 percent of the concentrate of Example 3m.

The antifreeze compositions of Example 4 were tested to determine foaming characteristics according to ASTM D1881 method. The results of these tests are given in Table I below.

EXAMPLE 5

Comparison Example

To the base antifreeze composition of Example 4, there is added 0.03 percent by weight of a defoamer now in commercial use. This defoamer is a polyoxyethylene adduct of polyoxypropylene having a molecular weight of about 1750 and containing 10 percent by weight of ethylene oxide units.

This antifreeze composition was also tested to determine foaming characteristics according to ASTMD 1881 method for comparison with the various antifreeze compositions of Example 4. The results of this test are given in Table I below.

TABLE I

| Antifreeze Solution | Foam Height, ml/ Breaktime, sec. |
|---|---|
| Base antifreeze of Example 4 | Foamed out of test vessel |
| Example 4a | 85/2.2 |
| Example 4b | 96/3 |

TABLE I-continued

| Antifreeze Solution | Foam Height, ml/Breaktime, sec. |
|---|---|
| Example 4c | 96/2.1 |
| Example 4d | 95/2.4 |
| Example 4e | 118/2.6 |
| Example 4f | 105/2.6 |
| Example 4g | 205/5.3 |
| Example 4h | 151/5 |
| Example 4i | 315/7 |
| Example 4j | 161/7 |
| Example 4k | 268/6.6 |
| Example 4l | 205/6.6 |
| Example 4m | 255/5.4 |
| Example 5 | 290/10 |

From the above table, it is seen that a rather extensive group of defoamers have as good or better initial defoaming characteristics as the presently used defoaming agent. In addition, all of defoamer concentrates have improved solubility and avoid the problem heretofore encountered when using the composition of Example 5.

The particular antifreeze composition tested utilizes the corrosion inhibitor of U.S. Pat. No. 3,931,029 cited above, which provides excellent protection against attack of the solder and like vulnerable materials in the cooling system of automobiles and the like. This corrosion inhibitor, while excellent in its protection, tends to cause severe foaming in the antifreeze-water mixture of cooling systems. Accordingly, the defoamers of the present invention are particularly valuable when used with the inhibitors of the cited patent, herein referred to as diacid type inhibitors.

Although the defoaming agents of the invention are particularly valuable when used with corrosion inhibitor systems containing, as a component thereof, a diacid type inhibitor, the agents are also valuable in antifreeze formulations in general because of their improved solubility. Most of the proprietary antifreeze formulations are similar to the base antifreeze of Example 4, except that the proportions of corrosion inhibitors vary, and phosphates are frequently included.

The defoaming agents of the present invention were tested as a component of two proprietary formulations to determine defoaming characteristics during usage and stability to heat. The proprietary formulations did not contain a diacid type inhibitor and therefore the foaming problem is reduced. However, it would be advantageous to add at least some diacid type inhibitor to these formulations, and the defoaming agents of this invention would also provide for such addition.

A proprietary antifreeze used by General Motors was tested according to ASTM D1881 using no defoaming agent, 0.03 percent and 0.1 percent of the defoaming agent of Example 4, and 0.1 percent of the defoaming concentrates of Examples 3a through 3f. The results of these tests are shown in Table II below.

TABLE II

| Defoamer | Foam Height, ml/Breaktime, sec. |
|---|---|
| none | 90/4 |
| 0.03% agent of Example 5 | 65/1 |
| 0.1% agent of Example 5 | 55/1 |
| 0.1% agent of Example 4a | 60/2 |
| 0.1% agent of Example 4b | 80/2 |
| 0.1% agent of Example 4c | 80/2 |
| 0.1% agent of Example 4d | 80/2 |
| 0.1% agent of Example 4e | 75/1 |
| 0.1% agent of Example 4f | 75/1 |

From Table II above, it is seen that the defoaming agents of the invention are comparable to the defoaming agent of Example 4 at 0.03 percent. This is the amount of the defoaming agent of Example 4 generally used because of limited solubility thereof. However, the defoaming agents of the invention can be used at the given concentrations or even higher.

Thermal stability tests were also conducted on the defoaming agent of Example 4a and of Example 5 in the proprietary antifreeze used in the tests of Table II. In both cases, the samples were diluted with 2 parts of distilled water per part antifreeze and boiled for 16 hours. No change in the foam height or break time occured in either sample indicating complete thermal stability of both defoaming agents.

Tests for thermal and hydrolytic stability were carried out on the defoamer concentrate of Example 3a, the concentrate of Example 3b, and the nonionic surfactant of Example 5 according to the ASTM D2570 simulated service test. In this test, the test stand was initially filled with a proprietary antifreeze used by General Motors, and a sample taken and tested for foam (ASTM D1881). Then, 0.1 percent of the experimental defoamer being tested is added and a sample taken and tested for foam. Twice a week, samples are withdrawn from the test stand and foam determined. If poor foam results are obtained, a new defoamer is added to the test stand without flushing the stand and the test with the new defoamer is continued. Results of the simulated service test are shown in Table III below.

TABLE III

| Defoamer and Amount From | Foam Height, ml/Breaktime, Sec. | | Test Hours After Defoamer Addition to Reach Excess-ive Foam |
|---|---|---|---|
| | After Initial Defoamer Addition | At time of Excessive Foam | |
| none | 345/22 | | |
| Example 4a | 70/2 | *F.O./23 | 378 |
| Example 4b | 55/1.5 | F.O./20 | 133 |
| Example 5 | 215/108 | F.O./33 | 363 |

*F.O. means foamed out of test vessel.

From the data given above, it is indicated that the thermal and hydrolytic stability of the defoamers of this invention are comparable to the stability of the defoamers now in use.

Certain of the defoaming agents were tested in a proprietary antifreeze used by Chrysler to determine hydrolytic stability in actual service, and the results compared with those obtained using the nonionic surfactant defoamer of Example 5.

Table IV gives foam test results of an employee car fleet test using the defoamer concentrates of Examples 3a, 3b, 3d, 3e, 3f and 5 in the proprietary antifreeze solution. The results shown are for samples taken after one and two months of testing. The antifreeze samples were tested "as is", i.e., they were not diluted to the ⅓ percent concentration specified in ASTM D1881. With this exception, the foam test procedure as outlined in ASTM D1881 was used. The cooling systems of the cars were not flushed or cleaned prior to adding the defoamers.

TABLE IV

| Defoamer 0.1% Concentration | Foam height, ml/Breaktime, Sec. | | |
|---|---|---|---|
| | Prior to Defoamer Addition | After One Month of Testing (Mileage) | After Two Months of Testing (Mileage) |
| Example 3a | 205/8.5 | 120/5 (1473) | 105/5 (2636) |
| Example 3b | F.O./26 | 140/4 (1654) | 170/6 (2028) |
| Example 3c | 80/3 | 75/3 (862) | 290/12 (1282) |
| Example 3d | F.O./27 | 210/11 (846) | 270/19 (1917) |
| Example 3e | F.O./16 | 110/5 (521) | 145/5 (901) |
| Example 3f | F.O./42 | 135/5 (997) | 240/10 (2347) |
| Example 5 | F.O./13 | 55/2 (408) | 50/2 (959) |

The tests indicate that the defoamers of this invention retain their ability over a period of time.

The defoamer of Example 3b was tested under heavy use conditions in a group of taxi cabs. The cabs tested had 30,000 to 40,000 miles with the proprietary antifreeze prior to the addition of the defoamer. The foam heights and break times and the test mileage is given in Table V below.

TABLE V

| Cab No. | Foam Height, ml/Breaktime, Sec. | | Mileage Duration of Test |
|---|---|---|---|
| | Prior to Defoamer Addition | At Completion of Test | |
| 181 | 260/13 | 455/17 | 15,453 |
| 182 | 355/18 | 270/14 | 12,696 |
| 189 | 235/9 | 200/7 | 13,274 |
| 192 | 295/15 | 280/11 | 11,045 |
| 198 | 305/15 | 270/14 | 11,772 |
| 199 | F.O./23 | F.O./51 | 12,482 |

The cooling systems of these cabs were not flushed or cleaned prior to the addition of defoamer. The test was run for about two months. After about 12,000 miles of testing, the results shown that the foam level was maintained at a level lower than the initial level in 4 of the 6 cabs tested.

From the foregoing results, it is seen that antifreeze compositions may be made using the defoaming agents described herein. It has also been demonstrated that these defoaming agents have improved solubility in antifreeze, thereby solving a storage problem heretofore encountered. Moreover, the formulations have such good defoaming properties that they are suitable for use with corrosion inhibitor system which would otherwise cause excessive foam.

The embodiment of the invention in which an exclusive property or privilege is claimed are defined as follows:

1. In an antifreeze composition comprising a glycol freezing point depressant and a corrosion inhibitor system, a foam suppressing agent present in an amount of from about 0.001% to about 1.0% by weight of the antifreeze composition and consisting essentially of a mixture of (1) a compound having the formula

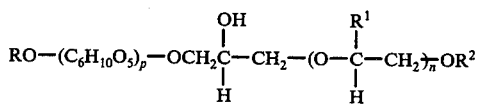

wherein R is an alkyl, alkoxyalkyl, hydroxyalkyl, or dihydroxyalkyl having from 1 to 6 carbon atoms, $R^1$ is hydrogen, methyl or ethyl, $R^2$ is an alkyl group having 1 to 8 carbon atoms, $p$ is an integer from 1 to 20, and $n$ is an integer from 1 to 14, and (2) a compound having the formula $$RO\text{-}(C_6H_{10}O_5)_p\text{-}H$$

wherein R and $p$ are as defined above, and wherein the weight ratio of compound (1) and compound (2) are from about 1:10 to 10:1.

2. An antifreeze composition as defined in claim 1, in which the $p$ integers are substantially all 1.

3. An antifreeze composition as defined in claim 1, in which $R^1$ is methyl.

4. An antifreeze composition as defined in claim 1, in which the corrosion inhibitor system comprises from 0.01% to 1% by weight of the antifreeze of at least one substance selected from the group consisting of a. compounds corresponding to the structural formula

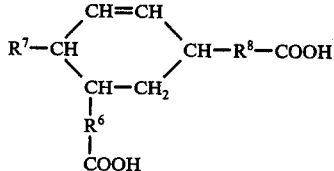

wherein $R^6$ is an alkylene radical containing from 0 to 12 carbon atoms, $R^7$ is an alkyl radical containing from 1 to 10 carbon atoms and $R^8$ is an alkylene radical containing from 1 to 12 carbon atoms, and b. the mono- and di- metal salts, the mono- and di- ammonium salts, and the mono- and di- amides of a.

5. An antifreeze composition as defined in claim 4, wherein the inhibitor comprises 1-carboxy-2-hexyl-5-(7-carboxyheptyl)-cyclohex-3-ene.

6. In an antifreeze composition comprising a glycol freezing point depressant and a corrosion inhibitor system, a foam suppressing agent present in an amount of from about 0.001% to about 1.0% by weight of the antifreeze composition and consisting essentially of a mixture of (1) a compound having the formula

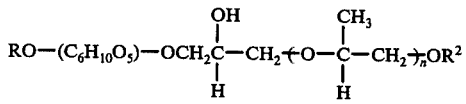

wherein R is an alkyl, alkoxyalkyl, hydroxyalkyl, or dihydroxyalkyl having from 1 to 6 carbon atoms, $R^2$ is an alkyl group having 1 to 8 carbon atoms, and $n$ is an integer from 3 to 7, and (2) a compound having the formula $$RO\text{-}(C_6H_{10}O_5)\text{-}H$$

wherein R is as defined above, and wherein the weight ratio of compound (1) and compound (2) are from about 1:3 to 3:2.

7. An antifreeze composition as defined in claim 6, in which R is a hydroxyalkyl group.

8. An antifreeze composition as defined in claim 6, in which $R^2$ is an alkyl group having 4-6 carbon atoms.

9. An antifreeze composition as defined in claim 6, in which the corrosion inhibitor system comprises from 0.01% to 1% by weight of the antifreeze of at least one substance selected from the group consisting of a. compounds corresponding to the structural formula

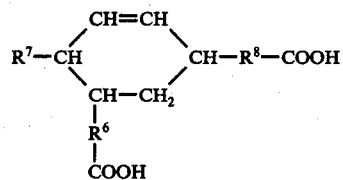

wherein $R^6$ is an alkylene radical containing from 0 to 12 carbon atoms, $R^7$ is an alkyl radical containing from 1 to 10 carbon atoms and $R^8$ is an alkylene radical containing from 1 to 12 carbon atoms, and b. the mono- and di- metal salts, the mono- and di-ammonium salts, and the mono- and di- amides of a.

10. An antifreeze composition as defined in claim 9, wherein the inhibitor comprises 1-carboxy-2-hexyl-5-(7-carboxyheptyl)-cyclohex-3-ene.

* * * * *